United States Patent
Onohara et al.

(10) Patent No.: US 9,168,877 B2
(45) Date of Patent: Oct. 27, 2015

(54) AIRBAG UNIT, FASTENING STRUCTURE, AND FASTENING MEMBER

(71) Applicants: Keisuke Onohara, Tokyo (JP); Hiromu Usuda, Tokyo (JP)

(72) Inventors: Keisuke Onohara, Tokyo (JP); Hiromu Usuda, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 14/382,583

(22) PCT Filed: Feb. 18, 2013

(86) PCT No.: PCT/JP2013/053899
§ 371 (c)(1),
(2) Date: Sep. 3, 2014

(87) PCT Pub. No.: WO2013/145931
PCT Pub. Date: Oct. 3, 2013

(65) Prior Publication Data
US 2015/0069740 A1    Mar. 12, 2015

(30) Foreign Application Priority Data

Mar. 27, 2012  (JP) ................................ 2012-072590
Jul. 23, 2012  (JP) ................................ 2012-162759

(51) Int. Cl.
*B60R 21/203* (2006.01)
*B60R 13/00* (2006.01)
*B60R 21/215* (2011.01)

(52) U.S. Cl.
CPC ............. *B60R 13/005* (2013.01); *B60R 21/203* (2013.01); *B60R 21/215* (2013.01); *B60R 2021/21543* (2013.01)

(58) Field of Classification Search
CPC .............. B60R 13/005; B60R 2021/21543; B60R 21/203; B60R 21/215
USPC ............................................ 280/728.3
See application file for complete search history.

(56) References Cited

U.S. PATENT DOCUMENTS 5,678,851 A    10/1997 Saito et al.
5,895,115 A  *  4/1999 Parker et al. .................. 362/511
(Continued)

FOREIGN PATENT DOCUMENTS

JP    H09-011833    1/1997
JP    H09-048315    2/1997
(Continued)

OTHER PUBLICATIONS

International Search Report mailed on Apr. 2, 2013.

*Primary Examiner* — James English
(74) *Attorney, Agent, or Firm* — IPUSA, PLLC

(57) ABSTRACT

An airbag unit includes an airbag, a cover part which covers the airbag, a fitting member which is fitted on a front side of the cover part, and a fastening member which fastens the fitting member on a back side of the cover part. The fastening member includes a first fastening part which is inserted from a side into a first locking part provided on the fitting member, in a state in which the first locking part penetrates the cover part to a back side of the cover part, a second fastening part which is inserted from the side into a second locking part provided on the fitting member, in a state in which the second locking part penetrates the cover part to the back side of the cover part, and a connecting part which connects a base end part of the first fastening part and a base end part of the second fastening part, and external shapes of the first fastening part and the second fastening part are mutually different.

17 Claims, 11 Drawing Sheets

(56) References Cited

U.S. PATENT DOCUMENTS

| | | | |
|---|---|---|---|
| 6,168,187 B1 * | 1/2001 | Yamada et al. | 280/728.3 |
| 7,775,550 B2 * | 8/2010 | Dominguez Aparicio et al. | 280/728.3 |
| 7,819,456 B2 * | 10/2010 | Robertson | 296/70 |
| 2001/0002965 A1 | 6/2001 | Ibe et al. | |
| 2001/0030414 A1 * | 10/2001 | Yokota et al. | 280/728.3 |
| 2005/0067815 A1 | 3/2005 | Dearden et al. | |
| 2011/0062688 A1 | 3/2011 | Hayashi | |
| 2012/0228855 A1 * | 9/2012 | Yamaji | 280/731 |
| 2014/0210190 A1 * | 7/2014 | Bosch et al. | 280/728.3 |
| 2014/0210191 A1 * | 7/2014 | Bosch et al. | 280/728.3 |

FOREIGN PATENT DOCUMENTS

| | | |
|---|---|---|
| JP | H10-119683 | 5/1998 |
| JP | 2001-225703 | 8/2001 |
| JP | 2006-103444 | 4/2006 |
| JP | 2009-280059 | 12/2009 |
| WO | WO 2008065202 A1 * | 6/2008 |

* cited by examiner

AIRBAG UNIT, FASTENING STRUCTURE, AND FASTENING MEMBER

TECHNICAL FIELD

The present invention relates to a technique to fasten, on a back side of a cover part that covers an airbag, a fitting member that is fitted on a front side of the cover part.

BACKGROUND ART

For example, an airbag unit for a driver's seat is mounted on a steering wheel for steering an automobile, and a fitting member, such as an emblem of an automobile company, may be fitted on a front side of a cover part of the airbag unit. Prior art that fastens the emblem on the cover part is known from Patent Document 1, for example.

PRIOR ART DOCUMENT

Patent Document

Patent Document 1: Japanese Laid-Open Patent Publication No. 9-11833

DISCLOSURE OF THE INVENTION

Problem to be Solved by the Invention

However, depending on a shape or the like of the fastening member that fastens the fitting member, such as the emblem, on the cover part, it may be difficult to prevent an erroneous setting of the fastening member.

Accordingly, one object of the present invention is to provide an airbag unit, a fastening structure, and a fastening member that can easily prevent the erroneous setting of the fastening member.

Means of Solving the Problem

According to one aspect of the present invention, an airbag unit includes:
  an airbag;
  a cover part which covers the airbag;
  a fitting member which is fitted on a front side of the cover part; and
  a fastening member which fastens the fitting member on a back side of the cover part,
  wherein the fastening member includes
    a first fastening part which is inserted from a side into a first locking part provided on the fitting member, in a state in which the first locking part penetrates the cover part to a back side of the cover part,
    a second fastening part which is inserted from the side into a second locking part provided on the fitting member, in a state in which the second locking part penetrates the cover part to the back side of the cover part, and
    a connecting part which connects a base end part of the first fastening part and a base end part of the second fastening part,
  wherein external shapes of the first fastening part and the second fastening part are mutually different.

According to one aspect of the present invention, a fastening structure includes:
  a cover part which covers an airbag;
  a first locking part and a second locking part provided on a fitting member which is fitted on a front side of the cover part; and
  a fastening member which fastens the fitting member on a back side of the cover part,
  wherein the fastening member includes
    a first fastening part which is inserted from a side into the first locking part in a state in which the first locking part penetrates the cover part to a back side of the cover part,
    a second fastening part which is inserted from the side into the second locking part, in a state in which the second locking part penetrates the cover part to the back side of the cover part, and
    a connecting part which connects a base end part of the first fastening part and a base end part of the second fastening part,
  wherein external shapes of the first fastening part and the second fastening part are mutually different.

According to one aspect of the present invention, a fastening member to fasten a fitting member, which is fitted on a front side of a cover part covering an airbag, to a back side of the cover part, includes:
  a first fastening part which is insertable with respect to a first locking part provided on the fitting member;
  a second fastening part which is insertable with respect to a second locking part provided on the fitting member; and
  a connecting part which connects a base end part of the first fastening part and a base end part of the second fastening part,
  wherein external shapes of the first fastening part and the second fastening part are mutually different.

Effects of the Invention

According to the disclosed airbag unit, fastening structure, and fastening member, it is possible to easily prevent the erroneous setting of the fastening member.

MODE OF CARRYING OUT THE INVENTION

A detailed description will hereinafter be given of embodiments of the present invention with reference to the drawings.

[Configuration of Airbag Unit 1]

Figure 1:
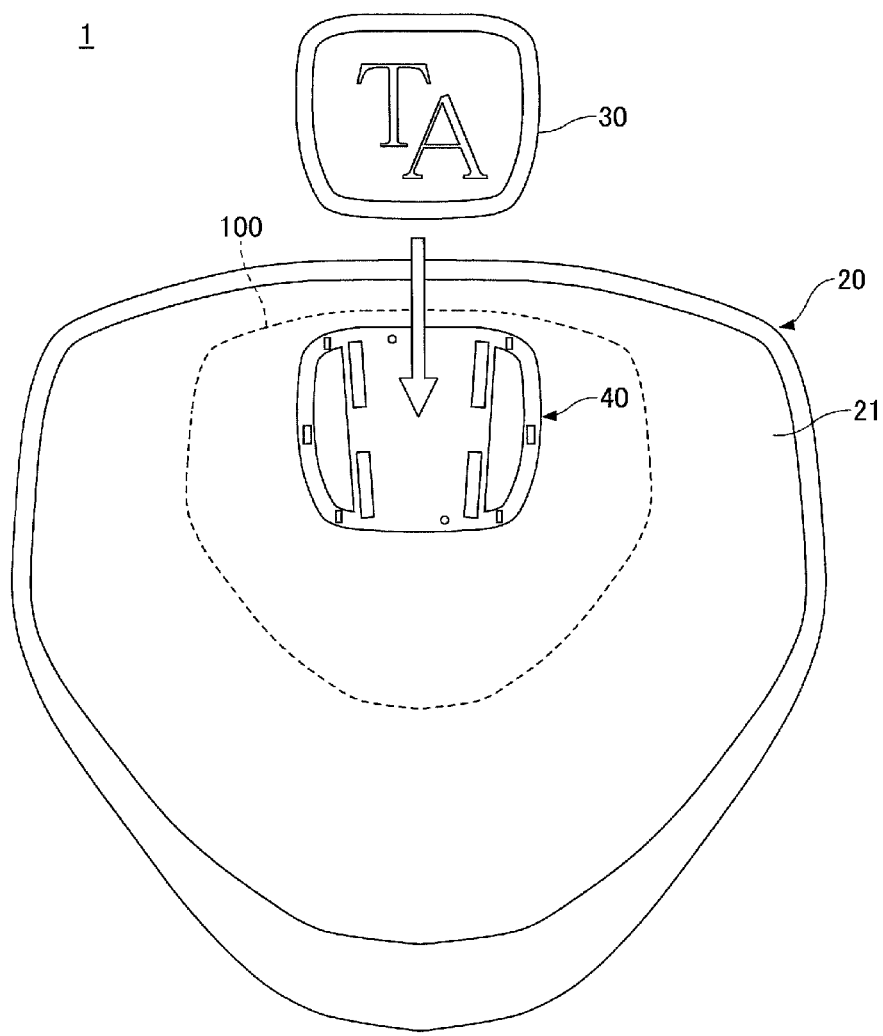
FIG. 1 is a diagram illustrating an airbag unit.

FIG. 1 is a diagram illustrating an airbag unit 1 in one embodiment of the present invention. The airbag unit 1 includes an airbag 100, a cover part 20, a fitting member 30, and a fastening member which will be described later. The airbag 100 is inflated by a gas supplied from an inflator that is included in the airbag unit 1 but is not illustrated in FIG. 1, and at least a part of the cover part 20 is split when the inflation exceeds a predetermined amount in order to allow the inflated airbag 10 to extend outside the cover part 20. For example, in a case in which the airbag unit 1 is mounted on a vehicle, the airbag 100 is inflated between the vehicle and a passenger. The cover part 20 is fixed to a support member that is included in the airbag unit 1 but is not illustrated in FIG. 1, in a state in which the cover part 20 covers the airbag 100 before the inflation that is folded and accommodated. The cover part 20 may be formed by a rein material, such as a thermoplastic elastomer, for example. The fitting member 30 is a part that is fitted on a front surface 21 side of the cover part 20 so that the fitting member 30 is visible by the passenger. An example of the fitting member 30 includes an ornament part, such as an emblem of the automobile company. The shape, size, and pattern of the fitting member 30 illustrated in FIG. 1 are merely an example, and the shape, size, and pattern of the fitting member 30 are not limited to those illustrated in FIG. 1. A mounting part 40 on which the fitting member 30 is fitted is formed at a center part of the front surface 21 side of the cover part 20.

Figure 2:
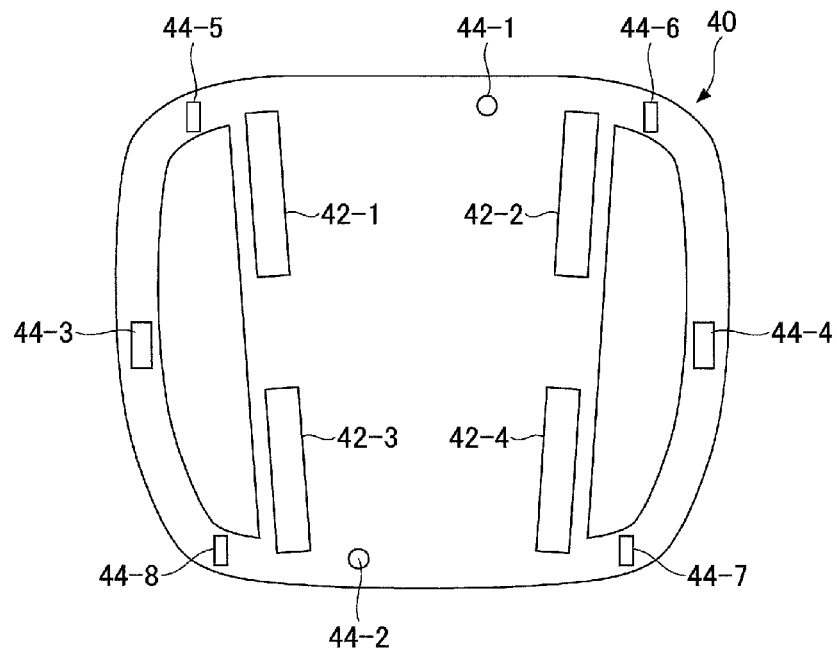
FIG. 2 is a diagram, on an enlarged scale, illustrating a mounting part for a fitting member, formed on a cover part of the airbag unit.

FIG. 2 is a diagram, on an enlarged scale, illustrating the mounting part 40 on which the fitting member 30 is fitted. The mounting part 40 of the cover part 20 includes elongated rectangular mounting holes 42-1 through 42-4, into which U-shaped locking parts 32-1 through 32-4 provided on the fitting member 30 are inserted, that penetrate from a front side to a back side of the cover part 20. In this example, the front side of the cover part 20 refers to the front surface 21 side, and the back side of the cover part 20 refers to a side opposite to the front surface 21. The U-shaped locking parts 32-1 through 32-4 will be described later. Circular and rectangular mounting holes 44-1 through 44-8 are formed in a periphery of the mounting holes 42-1 through 42-4, and penetrate the front side to the back side of the cover part 20.

[Configuration of Setting Member 30]

Figure 3:
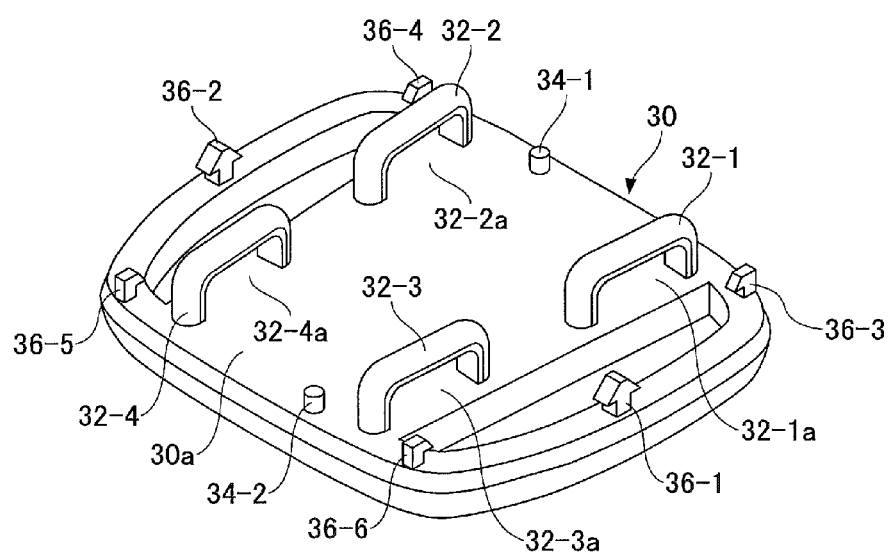
FIG. 3 is a perspective view of the fitting member viewed from a back side.
Figure 4:
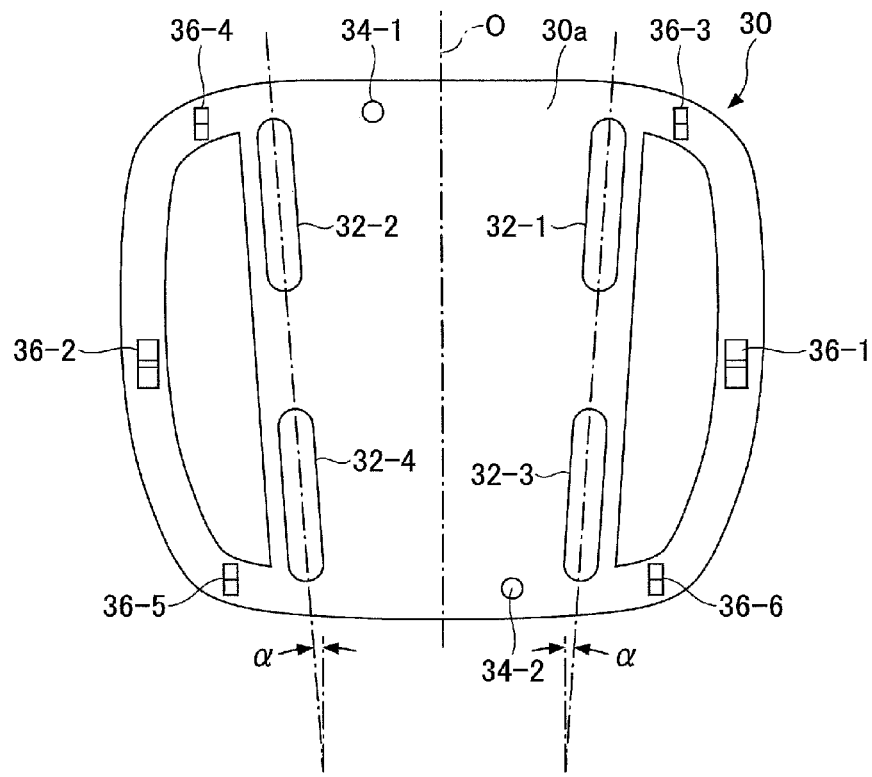
FIG. 4 is a bottom view of the fitting member viewed from the back side.
Figure 5:
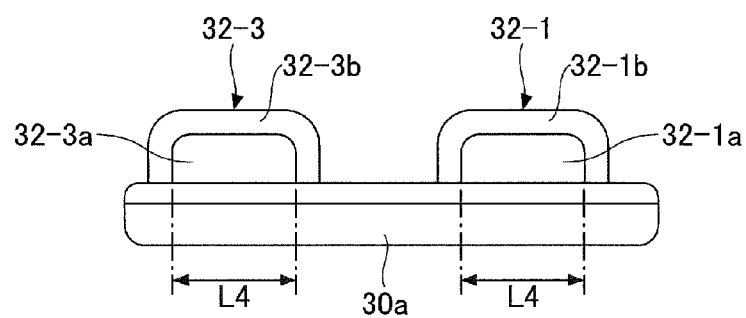
FIG. 5 is a side view of the fitting member illustrated in FIG. 4 viewed from a right side.

FIG. 3 is a perspective view of the fitting member 30 viewed from the back side. FIG. 4 is a bottom view of the fitting member 30 viewed from the back side. FIG. 5 is a side view of the fitting member 30 illustrated in FIG. 4 viewed from a right side.

The fitting member 30 may be formed by a metal material, such as an aluminum alloy having a hairline finish, or by a resin material such as an ABS (Acrylonitrile Butadiene Styrene) copolymer, or by other materials.

The 4 U-shaped locking parts 32-1 through 32-4 project from the back side of a base 30a of the fitting member 30. Positioning bosses 34-1 and 34-2, and locking hook parts 36-1 through 36-6 locked (that is, held) on the cover part 20, are provided in a peripheral edge part of the back surface of the base 30a as illustrated in FIG. 4, although the illustration thereof is omitted in FIG. 5. The fitting member 30 is positioned with respect to the mounting part 40 of the cover part 20, due to the positioning bosses 34-1 and 34-2 that are inserted into the mounting holes 44-1 and 44-2 in the mounting part 40 of the cover part 20. In addition, the fitting member 30 is held in a state in which the back side of the fitting member 30 is in contiguous contact with the mounting part 40, due to the locking hook parts 36-1 through 36-6 that are provided at the 6 locations illustrated in FIG. 3 and lock (that is, are inserted into and lock) the mounting holes 44-3 through 44-8 of the mounting part 40.

The U-shaped locking parts 32-1 through 32-4 are formed to project in a form of a gate with respect to the back side of the fitting member 30, and form fastening holes 32-1a through 32-4a into which the fastening member which will be described later is inserted between the back side of the fitting member 30 and the U-shaped locking parts 32-1 through 32-4.

In addition, as illustrated in FIG. 4, the U-shaped locking parts 32-1 through 32-4 when viewed from the back side of the fitting member 30 are formed to extend in a direction inclined by a predetermined angle α with respect to a centerline O in a vertical direction of the fitting member 30 in FIG. 4. In the case of the example illustrated in FIG. 4, the U-shaped locking parts 32-1 and 32-2 are arranged in line symmetry with respect to the centerline O on the back side of the fitting member 30, and the U-shaped locking parts 32-3 and 32-4 are arranged in line symmetry with respect to the centerline O on the back side of the fitting member 30.

Figure 6:
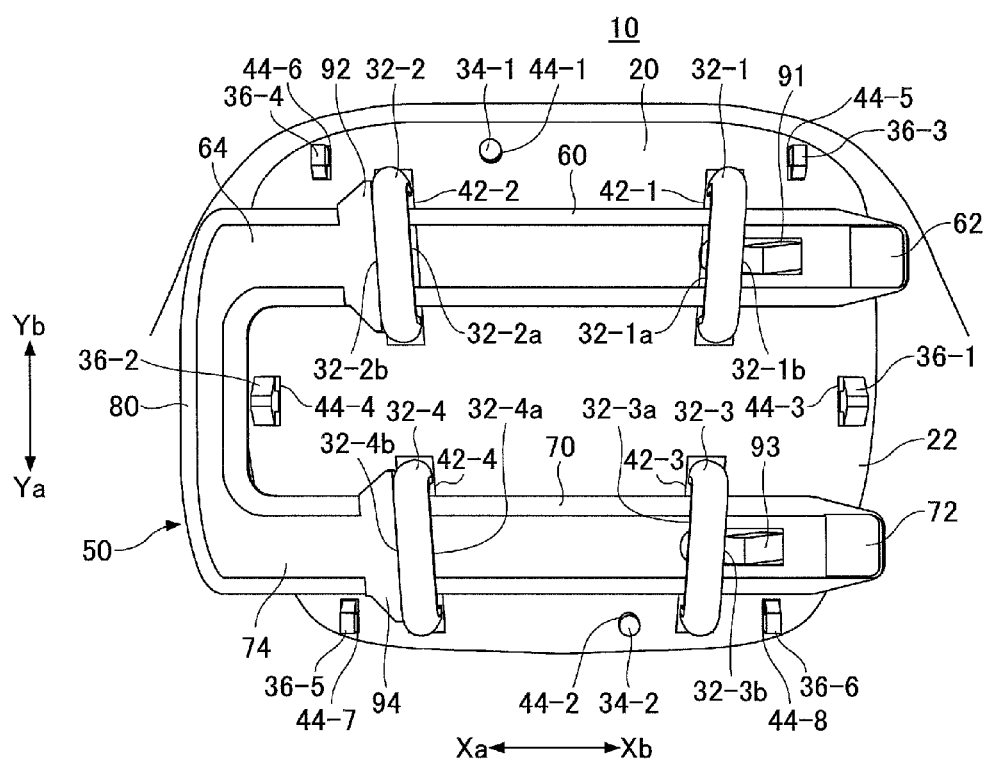
FIG. 6 is a diagram illustrating a fastening structure.

FIG. 6 is a diagram illustrating a fastening structure 10 in one embodiment of the present invention. The fastening structure 10 includes the cover part 20, the U-shaped locking parts 32-1 through 32-4 of the fitting part 30 projecting towards the back surface 22 side of the cover part 20, and a fastening member 50 that fastens the U-shaped locking parts 32-1 through 32-4 of the fitting member 30 to the cover part 20 on the back surface 22 side. In this embodiment, a description will be given of an example in which the fitting member 30, which is the emblem of the automobile company, is fitted on the front side of the cover part 20, however, the present invention may of course be applied to a case in which the fitting member other than the emblem is fastened.

In addition, when fastening the fitting member 30 that is fitted on the front side of the cover part 20, the U-shaped locking parts 32-1 through 32-4 are fastened to the back surface 22 side of the cover part 20 by the so-called gate-bar structure in which first and second fastening parts 60 and 70 of the fastening member 50 are inserted into the fastening holes 32-1a through 32-4a of the U-shaped locking parts 32-1 through 32-4 of the fitting member 30.

[Configuration of Fastening Member 50]

Figure 7:
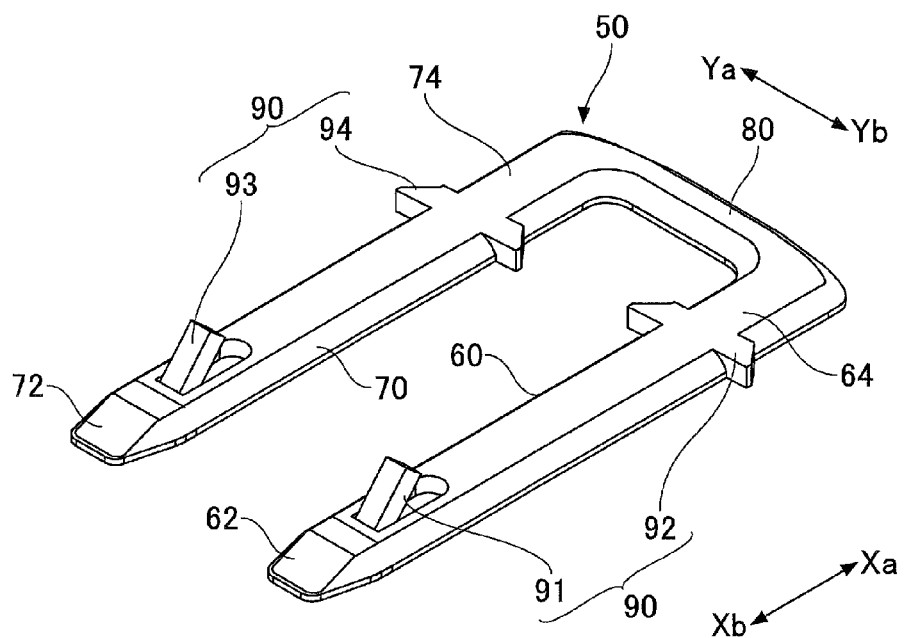
FIG. 7 is a perspective view of the fastening member viewed obliquely from an upper direction.
Figure 8:
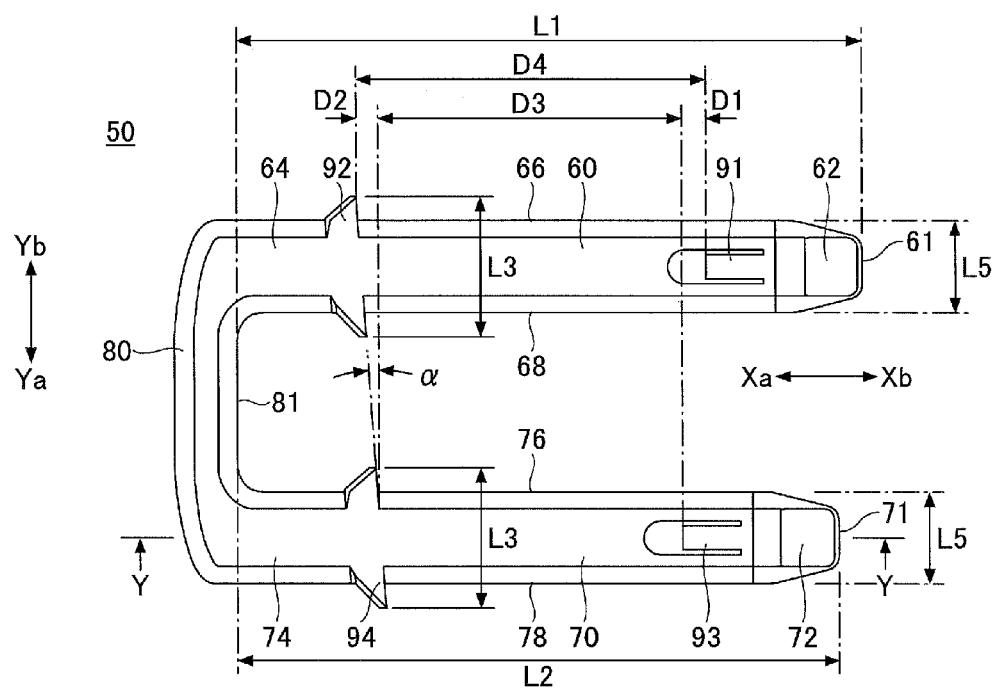
FIG. 8 is a plan view of the fastening member in one embodiment.
Figure 9:
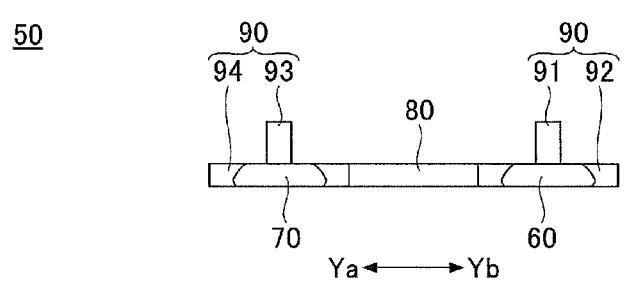
FIG. 9 is a side view of the fastening member viewed from a right side in FIG. 8.
Figure 10:
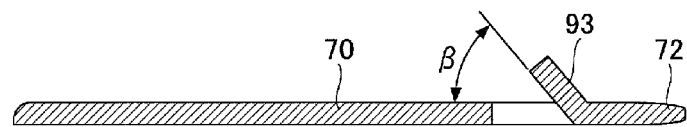
FIG. 10 is a vertical cross sectional view of the fastening member along a line Y-Y in FIG. 8.

FIG. 7 is a perspective view of the fastening member 50 viewed obliquely from an upper direction. FIG. 8 is a plan view of the fastening member 50 in one embodiment. FIG. 9 is a side view of the fastening member 50 viewed from a right side in FIG. 8. FIG. 10 is a vertical cross sectional view of the fastening member 50 along a line Y-Y in FIG. 8.

The fastening member 50 is formed by a thermoplastic resin or the like, for example, and includes the first and second fastening parts 60 and 70 extending parallel to a direction Xa and/or a direction Xb (hereinafter also referred to as a "direction X"), a connecting part 80 connecting base end parts 64 and 74 of the first and second fastening parts 60 and 70, and disengagement preventing parts 90 that prevent the first and second fastening parts 60 and 70 from disengaging from the U-shaped locking parts 32-1 through 32-4, for example, as illustrated in FIG. 7.

The fastening member 50 is configured to connect the base end parts 64 and 74 of the two fastening parts 60 and 70 extending linearly in the direction X by the connecting part 80, and thus, is formed in a C-shape (or U-shape), however, the fastening member 50 may have a shape other than the C-shape depending on the shape of the connecting part 80. In addition, tip end parts 62 and 72 of the first and second fastening parts 60 and 70 may have a tapered shape that becomes thinner towards an apex part side so that the first and second fastening parts 60 and 70 can easily be inserted into the fastening holes 32-1a through 32-4a of the U-shaped locking parts 32-1 through 32-4.

The first fastening part 60 and the second fastening part 70 are respectively formed in a rod shape so as to extend in the direction X. The first fastening part 60 and the second fastening part 70 are formed to asymmetrical shapes with respect to an imaginary straight line extending in the direction X and connecting the first fastening part 60 and the second fastening part 70, and external shapes of the first fastening part 60 and the second fastening part 70 are mutually different. Because the first fastening part 60 and the second fastening part 70 have mutually different shapes, even if a worker or a setting apparatus sets the fastening member 50 on the back side of the cover part 20 according to an incorrect setting method, for example, an error can be confirmed visually or by image recognition, and for this reason, the erroneous setting of the fastening member 50 can easily be prevented.

For example, in FIG. 8, at least one of a length and a width of the first fastening part 60 and the second fastening part 70 may be set to different dimensions between the two fastening parts 60 and 70. The length of the first fastening part 60 refers to the length of the first fastening part 60 extending in the direction X from the base end part 64 to the tip end part 62 of the first fastening part 60. The length of the second fastening part 70 refers to the length of the second fastening part 70 extending in the direction X from the base end part 74 to the tip end part 72 of the second fastening part 70. The width of the first fastening part 60 refers to a length between side surfaces 66 and 68 of the first fastening part 60 in a direction Ya and/or a direction Yb (hereinafter also referred to as a "direction Y") along which the first fastening part 60 and the second fastening part 70 are separated. The width of the second fastening part 70 refers to a length between side surfaces 76 and 78 of the second fastening part 70 in the direction Y along which the first fastening part 60 and the second fastening part 70 are separated.

In the case of the embodiment illustrated in FIG. 8, for example, a length L1 of the first fastening part 60 is formed to be longer than a length L2 of the second fastening part 70 (L1>L2). The length L1 is a length from a joining part 81 between the base end part 64 and the connecting part 80 to an apex part 61 of the tip end part 62 along the direction X, and the length L2 is a length from the joining part 81 between the base end part 74 and the connecting part 80 to an apex part 71 of the tip end part 72 along the direction X.

By setting the length L1 of the first fastening part 60 and the length L2 of the second fastening part 70 to different dimensions, when setting the fastening member 50 with respect to the back side of the cover part 20, it is possible to prevent an erroneous insertion of the fastening member 50 from the right direction towards the left direction (that is, in the direction Xa) when the correct insertion is from the left direction towards the right direction (that is, in the direction Xb). In addition, by setting the length L1 of the first fastening part 60 and the length L2 of the second fastening part 70 to different dimensions, when setting the fastening member 50 with respect to the back side of the cover part 20, it is possible to prevent an erroneous insertion of the fastening member 50 which is turned over even when the inserting direction is from the left direction towards the right direction (that is, in the direction Xb) and correct. Furthermore, in a case in which the fastening member 50 is inserted from the right direction towards the left direction (that is, in the direction Xa) without the user noticing that the inserting direction of the fastening member 50 is incorrect, the positions of the disengagement preventing parts 90 do not match the positions of the U-shaped locking parts 32-1 through 32-4, to thereby prevent the erroneous insertion of the fastening member 50.

Figure 11:
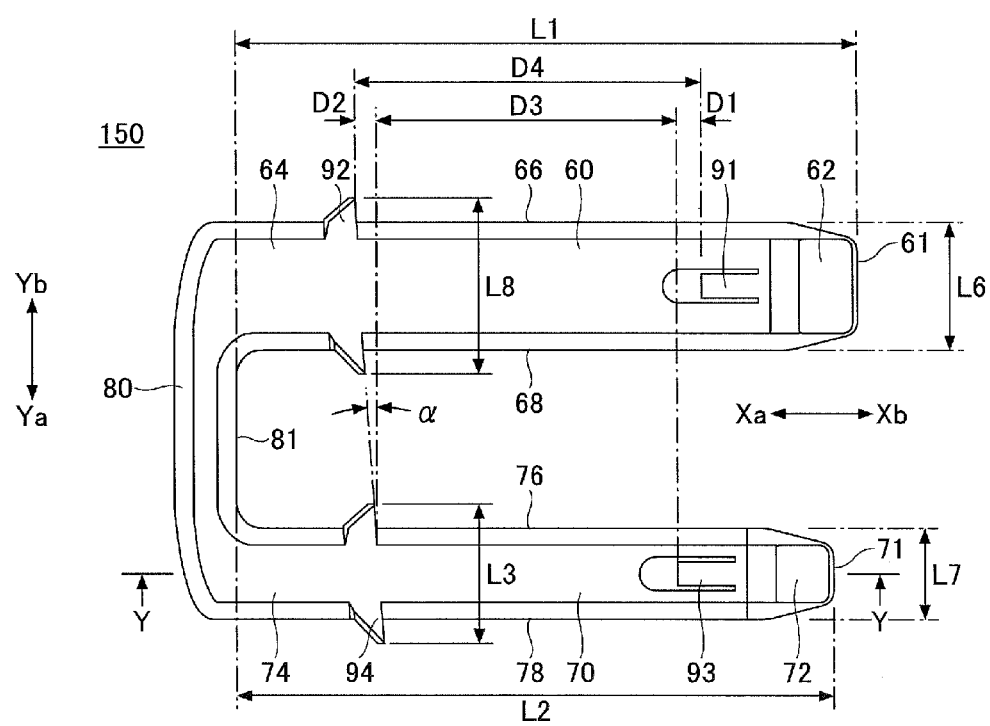
FIG. 11 is a plan view of the fastening member in another embodiment.

In addition, in the case of a fastening member 150 in another embodiment illustrated in FIG. 11, for example, a width L6 of the first fastening part 60 is formed to be longer than a width L7 of the second fastening part 70 (L6>L7). Because the width L6 of the first fastening part 60 is formed to be longer than the width L7 of the second fastening part 70, an opening dimension L4 of the fastening holes 32-1a and 32-2a illustrated in FIG. 5 may be formed to be larger than an opening dimension L4 of the fastening holes 32-3a and 32-4a, so that the first fastening part 60 can pass through the fastening holes 32-1a and 32-2a illustrated in FIG. 3 and the second fastening part 70 can pass through the fastening holes 32-3a and 32-4a. By setting the width L6 and the width L7 to different dimensions, even if the inserting direction of the fastening member 50 is from the left direction towards the right direction (that is, in the direction Xb) and correct, it is possible to prevent the fastening member 50 from being turned over and inserted when fitting the fastening member 50.

Moreover, in FIG. 6, for example, one of the first fastening part 60 and the second fastening part 70 may be formed so that it cannot pass through two of the U-shaped locking parts 32-1 through 32-4 through which the other of the first fastening part 60 and the second fastening part 70 is designed to pass through. For example, the first fastening part 60 may be formed to a size such that the first fastening part 60 cannot pass through at least one of the U-shaped locking parts 32-3 and 32-4. Alternatively, the second fastening part 70 may be formed to a size such that the second fastening part 70 cannot pass through at least one of the U-shaped locking parts 32-1 and 32-2. By forming one of the first fastening part 60 and the second fastening part 70 in the above described manner, even if the inserting direction of the fastening member 50 is from the left direction towards the right direction (that is, in the direction Xb) and correct, it is possible to easily prevent the fastening member 50 from being turned over and erroneously inserted when fitting the fastening member 50, because the fastening member 50 which is turned over cannot be inserted. In FIG. 11, for example, the width L6 of the first fastening part 60 may be formed to a dimension larger than the width L7 of the second fastening part 70, so that the first fastening part 60 cannot pass through the U-shaped locking parts 32-3 and 32-4.

Furthermore, the width L6 of the first fastening part 60 may have a dimension larger than the opening dimension L4 of at least one of the fastening holes 32-3a and 32-4a illustrated in FIG. 5, so that the first fastening part 60 cannot pass through the U-shaped locking parts 32-3 and 32-4. Accordingly, even when the inserting direction of the fastening member 150 is in the direction Xb and correct, if the fastening member 150 has an incorrect front-and-back relationship (that is, upside-down) when being inserted, the tip end part 62 of the first fastening part 60 makes contact with and is stopped by a side surface part of the U-shaped locking part 32-3 or the U-shaped locking part 32-4. On the other hand, even when the fastening member 150 has a correct front-and-back relationship when being inserted, if the inserting direction of the fastening member 150 is in the direction Xa and incorrect, if the fastening member 150 has an incorrect front-and-back relationship (that is, upside-down) when being inserted, the tip end part 62 of the first fastening part 60 similarly makes contact with and is stopped by the side surface part of the U-shaped locking part 32-3 or the U-shaped locking part 32-4. As a result, the first fastening part 60 cannot pass through the fastening hole 32-3a or 32-4a, and for this reason, even when an attempt is made to insert the fastening member 150 by such an erroneous insertion method, the erroneous insertion of the fastening member 150 can easily be prevented.

Of course, the width L7 of the second fastening part 70 illustrated in FIG. 11 may have a dimension larger than the opening dimension L4 of at least one of the fastening holes 32-1a and 32-2a illustrated in FIG. 5, so that the second fastening part 70 cannot pass through the U-shaped locking parts 32-1 and 32-2. In this case, it is possible to obtain effects similar to those described above in that the erroneous insertion of the fastening member 150 can easily be prevented. In addition, in order to prevent one fastening part from passing through the locking part through which the other fastening part is designed to pass through, a height of one fastening part may have a dimension larger than a height of the fastening hole through which the other fastening part is designed to pass through. In this case, it is also possible to obtain effects similar to those described above in that the erroneous insertion of the fastening member 150 can easily be prevented.

Figure 12:
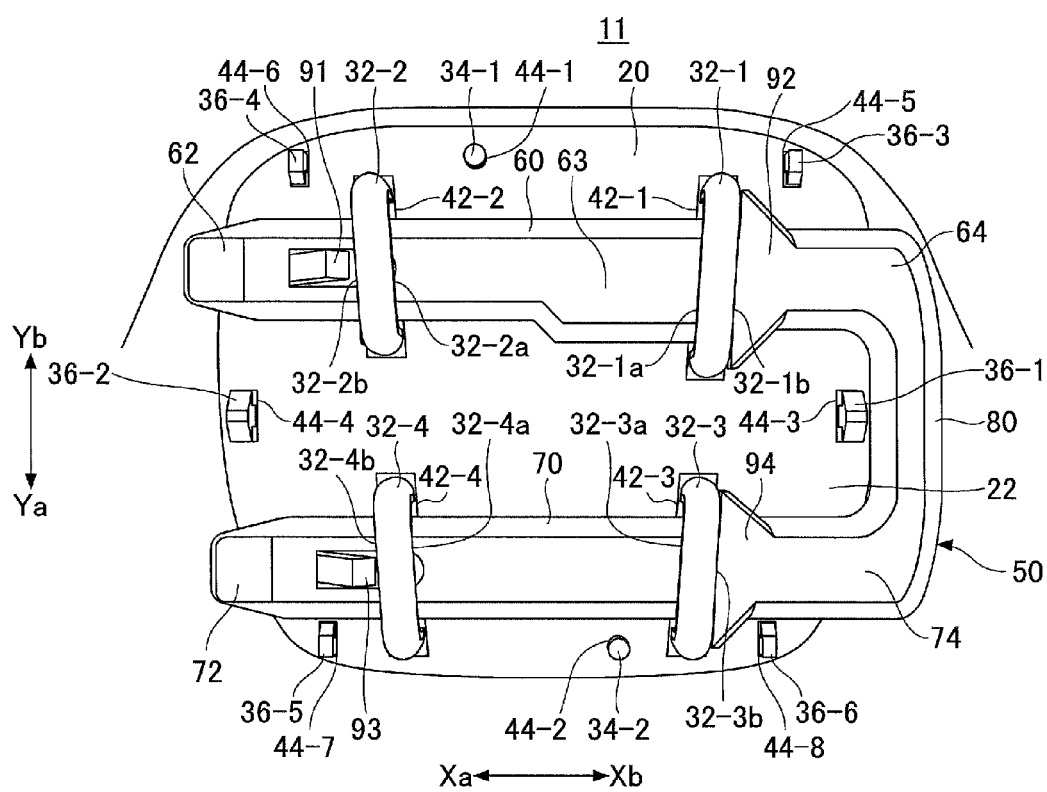
FIG. 12 is a diagram illustrating the fastening structure in the other embodiment.

FIG. 12 is a diagram illustrating the fastening member 50 and the fastening structure 11 in the other embodiment. In the case illustrated in FIG. 12, the first fastening part 60 includes a wide part 63 which is an example of an insertion disabling part that is formed to prevent the first fastening part 60 from being inserted into the U-shaped locking parts 32-1 and 32-2 from a side opposite to the correct side. In the case illustrated in FIG. 12, the correct inserting direction is the direction Xa. The wide part 63 which is wider than the tip end part 62 is formed to be located between the U-shaped locking parts 32-1 and 32-2 in a correct fastened state illustrated in FIG. 12. The U-shaped locking parts 32-1 and 32-2 are an example of inserted parts that are arranged in the inserting direction of the first fastening part 60. A description on a configuration similar to that illustrated in FIG. 6 will be omitted.

The wide part 63 illustrated in FIG. 12 is formed to a width less than or equal to the opening width of the fastening hole 32-1a so that the wide part 63 can pass through the U-shaped locking part 32-1 when inserted from the side in the correct inserting direction Xa, and larger than an opening width of the fastening hole 32-2a so that the wide part 63 cannot pass through the U-shaped locking part 32-2 when inserted from the side in the incorrect inserting direction Xb.

Figure 13:
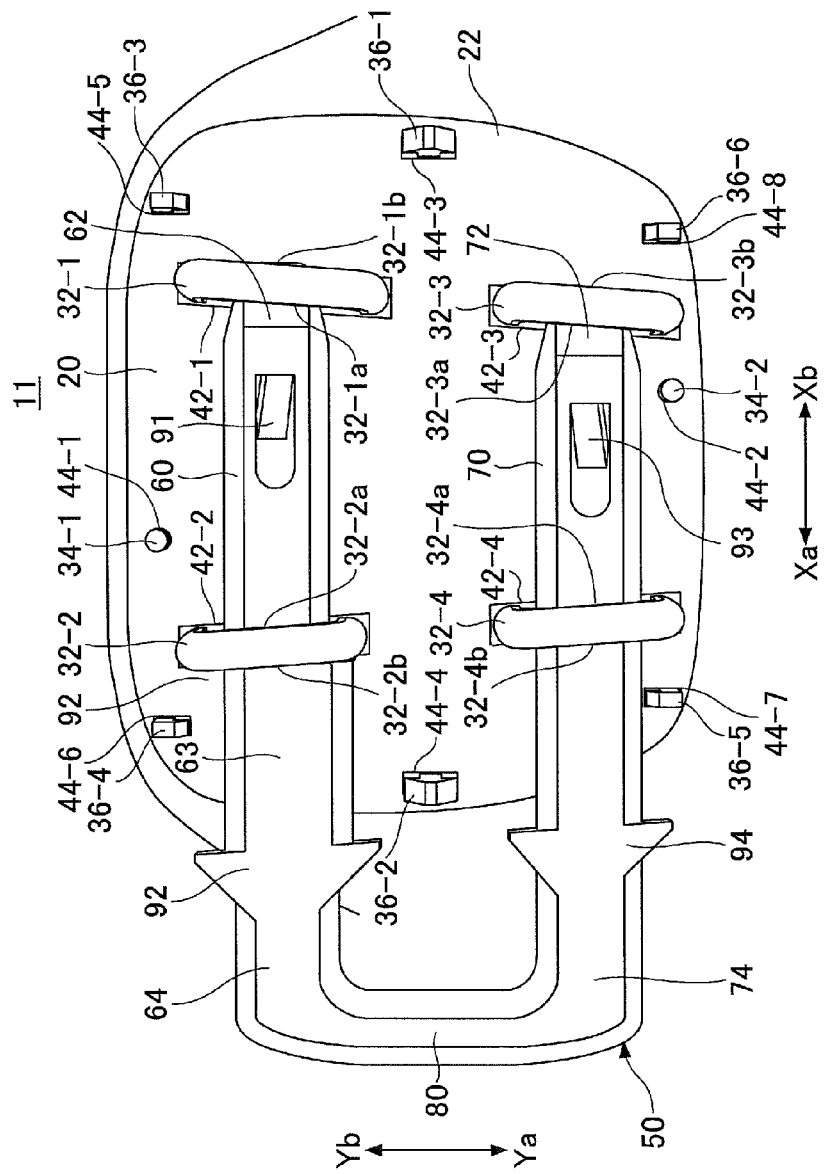
FIG. 13 is a diagram illustrating a setting state in which an inserting direction and a front-and-back relationship of the fastening member are both incorrect.

By the provision of the wide part 63, even if an attempt is made to turn over the fastening member 50 and insert the fastening member 50 in the incorrect inserting direction Xb as illustrated in FIG. 13, the wide part 63 makes contact with and is stopped by a side surface part 32-2b of the U-shaped locking part 32-2, and the wide part 63 cannot pass through the fastening hole 32-2a. Accordingly, even when an attempt is made to insert the fastening member 50 by such an erroneous insertion method, the erroneous insertion of the fastening member 50 can easily be prevented.

Figure 14:
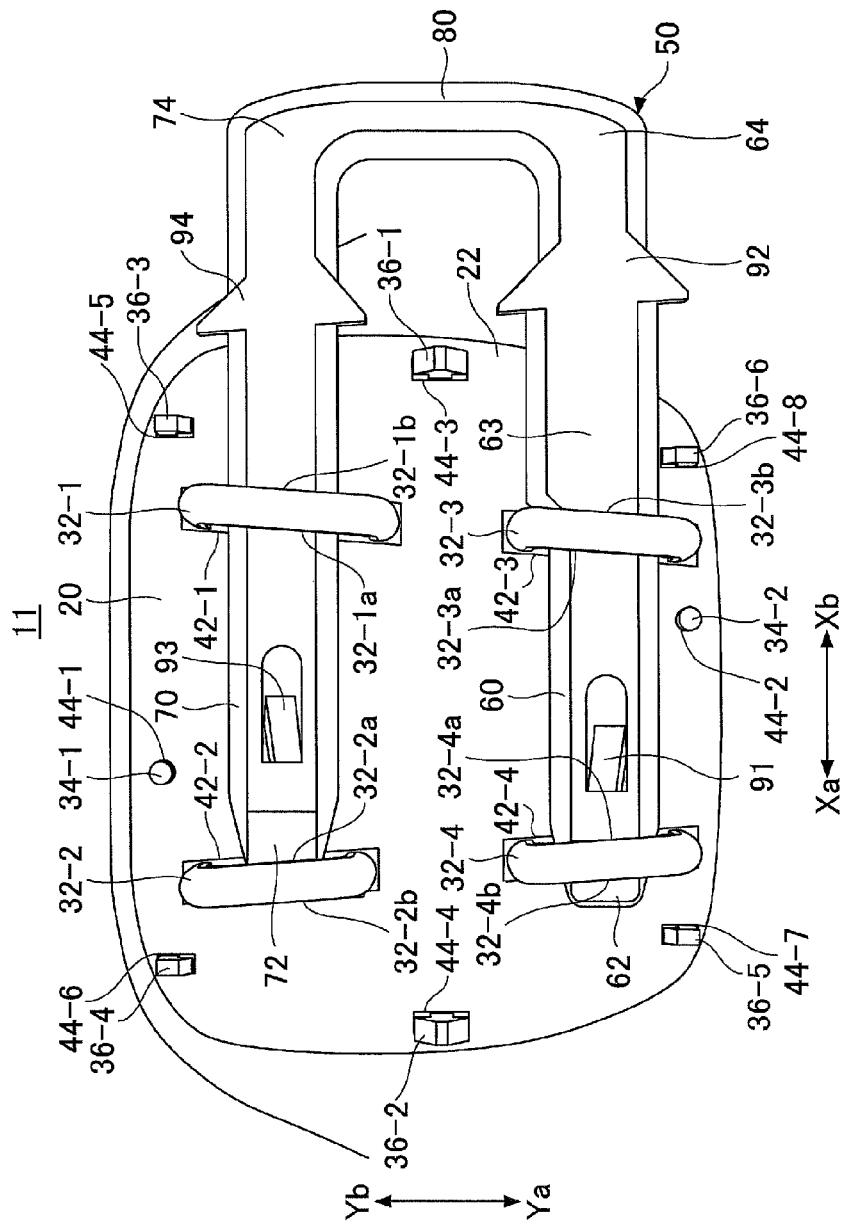
FIG. 14 is a diagram illustrating a setting state in which the inserting direction of the fastening member is correct and the front-and-back relationship of the fastening member is incorrect.

In addition, the wide part 63 is formed to a width larger than the opening width of the fastening hole 32-3a of the U-shaped locking part 32-3. Hence, even when the inserting direction of the fastening member 50 is in the correct direction Xa as illustrated in FIG. 14, if the front-and-back relationship of the fastening member 50 is incorrect, the wide part 63 makes contact with and is stopped by a side surface part 32-3b of the U-shaped locking part 32-3, and the wide part 63 cannot pass through the fastening hole 32-3a. Accordingly, even when an attempt is made to insert the fastening member 50 by such an erroneous insertion method, the erroneous insertion of the fastening member 50 can easily be prevented.

Figure 15:
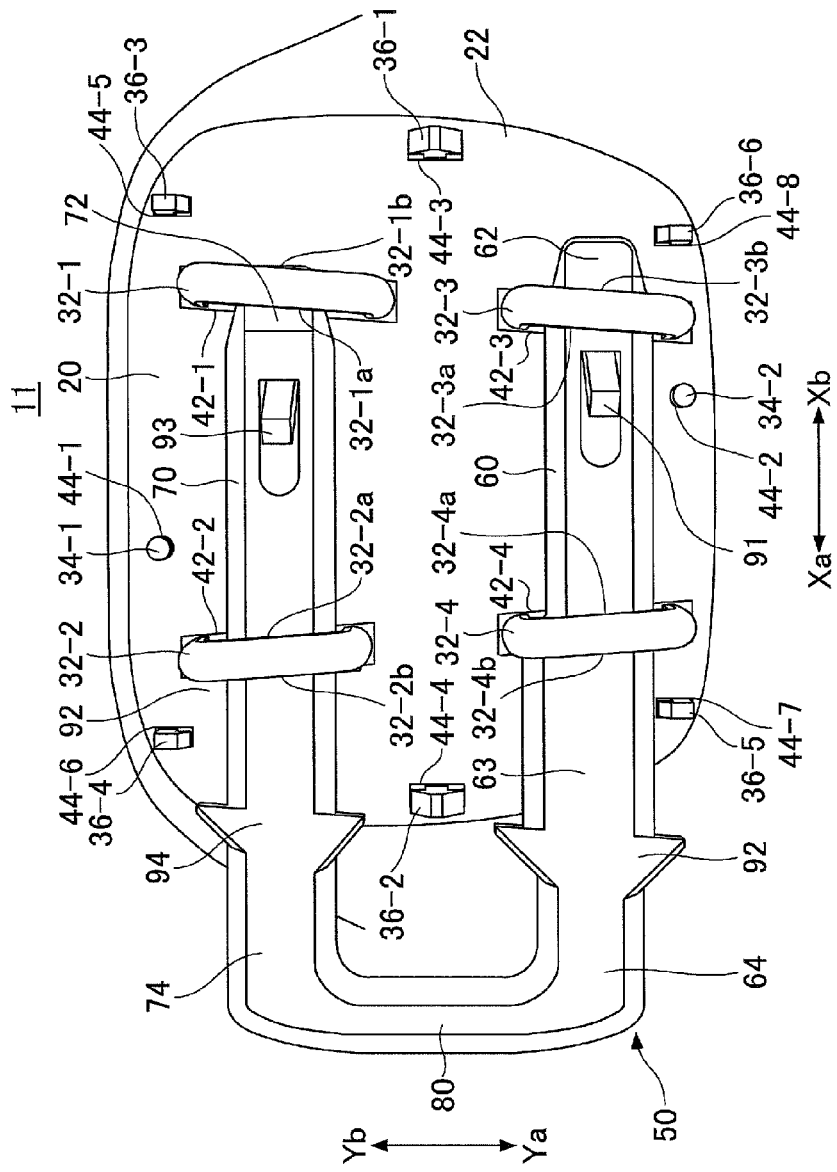
FIG. 15 is a diagram illustrating a setting state in which the inserting direction of the fastening member is incorrect and the front-and-back relationship of the fastening member is correct.

Moreover, the wide part 63 is formed to a width larger than the opening width of the fastening hole 32-4a of the U-shaped locking part 32-4. Accordingly, even when the front-and-back relationship of the fastening member 50 that is being inserted is correct as illustrated in FIG. 15, if the inserting direction of the fastening member 50 is incorrect, the wide part 63 makes contact with and is stopped by a side surface part 32-4b of the U-shaped locking part 32-4, and the wide part 63 cannot pass through the fastening hole 32-4a. Accordingly, even when an attempt is made to insert the fastening member 50 by such an erroneous insertion method, the erroneous insertion of the fastening member 50 can easily be prevented.

Of course, the wide part 63 may be formed on the second fastening part 70 in place of being formed on the first fastening part 60. In addition, although the width of a part of the fastening part is increased in the example described above, it is also possible to increase the height of a part of the fastening part.

In addition, in FIG. 12, in order to prevent the second fastening part 70 from passing through the U-shaped locking part 32-2, an external dimension (width or height) of the second fastening part 70 may be larger than the opening dimension (width or height) of the fastening hole 32-2a. In this case, even when the inserting direction of the fastening member 50 is in the correct direction Xa in FIG. 7, if the front-and-back relationship of the fastening member 50 when inserting the fastening member 50 is incorrect (upside-down), the tip end part 72 of the second fastening part 70 may pass through the U-shaped locking part 32-1 but will make contact with and be stopped by the right side surface part of the U-shaped locking part 32-2. In addition, even when the front-and-back relationship of the fastening member 50 when inserting the fastening member 50 is correct, if the inserting direction of the fastening member 50 is in the incorrect direction Xb in FIG. 7, for example, the tip end part 72 of the second fastening part 70 similarly makes contact with and is stopped by the left side surface part of the U-shaped locking part 32-2. Thus, the second fastening part 70 cannot pass through the fastening hole 32-2a. Accordingly, even when an attempt is made to insert the fastening member 50 by such an erroneous insertion method, the erroneous insertion of the fastening member 50 can easily be prevented.

As illustrated in FIGS. 6 and 7, the disengagement preventing part 90 includes first contact parts 91 and 93, and second contact parts 92 and 94. The first contact parts 91 and 93 are provided in a vicinity of the tip end parts 62 and 72 of the first and second fastening parts 60 and 70, respectively, and make contact with the side surface parts 32-1b and 32-3b provided on the right side in FIG. 6 on the side of the tip end parts 62 and 72 of the U-shaped locking parts 32-1 and 32-3. The second contact parts 92 and 94 are provided in a vicinity of the base end parts 64 and 74 of the first and second fastening parts 60 and 70, respectively, and make contact with the side surface parts 32-2b and 32-4b provided on the left side in FIG. 6 on the side of the base end parts 64 and 74 of the U-shaped locking parts 32-2 and 32-4.

The first contact parts 91 and 93 are cut and raised at the upper surface side of the first and second fastening parts 60 and 70, so as to be higher on the side of the base end parts 64 and 74 than on the side of the tip end parts 62 and 72 with respect to the upper surface of the first and second fastening parts 60 and 70. In addition, the first contact parts 91 and 93 are inclined by a predetermined angle β, so as to enable movement of the first and second fastening parts 60 and 70 in the inserting direction (that is, the direction Xb) with respect to the fastening holes 32-1a and 32-3a of the U-shaped locking parts 32-1 and 32-3, and to restrict movement of the first and second fastening parts 60 and 70 in an extracting direction (that is, the direction Xa) with respect to the fastening holes 32-1a and 32-3a of the U-shaped locking parts 32-1 and 32-3.

The height to which the first contact parts 91 and 93 are cut and raised is approximately the same height as a bridging part of the U-shaped locking parts 32-1 and 32-3. For this reason in FIG. 6, when the first and second fastening parts 60 and 70 are inserted from the side (that is, the direction Xb) into the fastening holes 32-1a through 32-4a of the U-shaped locking parts 32-1 through 32-4, the first contact parts 91 and 93 are bent from the inclined state towards the horizontal state in order to enable the insertion.

In addition, a sliding operation in the extracting direction (that is, the direction Xa) after the first and second fastening parts 60 and 70 are inserted into the fastening holes 32-1a through 32-4a of the U-shaped locking parts 32-1 through 32-4 is stopped because end parts of the first contact parts 91 and 93 that are cut and raised make contact with the side surface parts 32-1b and 32-3b of the U-shaped locking parts 32-1 and 32-3. Hence, the first contact parts 91 and 93 prevent the fastening member 50 from falling off.

Because the U-shaped locking parts 32-1 and 32-3 are arranged to extend in the direction inclined by the predetermined angle α with respect to the centerline O of the fitting member 30 in FIG. 4, the first contact part 91 and the first contact part 93 are arranged at positions shifted by a distance D1 in the direction X in FIG. 8 so as to correspond to the inclination direction of the U-shaped locking parts 32-1 and 32-3. The erroneous fitting of the fastening member 50 can easily be prevented by adjusting the distance D1 so that one of the first contact parts 91 and 93 cannot make contact with one of the side surface parts 32-1b and 32-3b of the U-shaped locking parts 32-1 and 32-3 to which the one of the first contact parts 91 and 93 is to make contact, even when an attempt is made to fit the fastening member 50 incorrectly.

A horizontal width dimension L3 of the second contact parts 92 and 94 in the directions Ya and Yb in FIG. 8 is formed to be larger than an opening dimension L4 of the fastening holes 32-1a through 32-4a of the U-shaped locking parts 32-1 through 32-4 illustrated in FIG. 5 (L3>L4). Accordingly, the second contact parts 92 and 94 project in the width direction (that is, the directions Ya and Yb) from the side surfaces 66, 68, 76, and 78 on the side of the base end parts 64 and 74 of the first and second fastening parts 60 and 70, and are formed to be wider than the fastening holes 32-1a through 32-4a of the U-shaped locking parts 32-1 through 32-4.

The second contact parts 92 and 94 are formed to project in a triangular shape from both the side surfaces 66 and 68 and from both the side surfaces 76 and 78 of the first and second fastening parts 60 and 70. In addition, because the U-shaped locking parts 32-2 and 32-4 are arranged to extend in the direction inclined by the predetermined angle α with respect to the centerline O of the fitting member 30 in FIG. 4, the second contact part 92 and the second contact part 94 are arranged at positions shifted by a distance D2 in the direction X in FIG. 8 so as to correspond to the inclination direction of the U-shaped locking parts 32-2 and 32-4. The erroneous fitting of the fastening member 50 can easily be prevented by adjusting the distance D2 so that one of the second contact parts 92 and 94 cannot make contact with one of the side surface parts 32-2b and 32-4b of the U-shaped locking parts 32-2 and 32-4 to which the one of the second contact parts 92 and 94 is to make contact, even when an attempt is made to fit the fastening member 50 incorrectly.

Furthermore, by adjusting distances D3 and D4 illustrated in FIG. 8 to mutually different dimensions so that at least one of the contact parts 91, 92, 93, and 94 cannot make contact with one of the side surface parts 32-1b through 32-4b of the U-shaped locking parts 32-1 through 32-4 to which the at least one of the contact parts 91, 92, 93, and 94 is to make contact, the erroneous fitting of the fastening member 50 can easily be prevented. The distance D4 refers to the distance between the first contact part 91 and the second contact part 92, and the distance D3 refers to the distance between the first contact part 93 and the second contact part 94.

Although the second contact parts 92 and 94 are formed to project in the triangular shape from both the side surface parts, the second contact parts 92 and 94 may project in other shapes, such as a rectangular shape, a trapezoidal shape, or the like.

Next, a description will be given of an operating procedure to fasten the fitting member 30 to the cover part 20 using the fastening member 50 of the fastening structure 10 having the configuration described above.

(Procedure 1)

As illustrated in FIGS. 1 through 5, the fitting member 30 is mounted on the mounting part 40 that is formed on the front side of the cover part 20. In this state, the U-shaped locking parts 32-1 through 32-4 of the fitting member 30 are inserted into the mounting holes 42-1 through 42-4 of the mounting part 40 from the front side so as to project from the back side. In addition, the positioning bosses 34-1 and 34-2 and the locking hook parts 36-1 through 36-8 of the fitting member 30 are inserted into the mounting holes 44-1 through 44-8 of the mounting part 40 and held by the cover part 20 (first fastening operation).

(Procedure 2)

As illustrated in FIG. 6, in a state viewed from the back surface of the cover part 20, the fastening member 50 is oriented so that the first contact parts 91 and 93 face the upper surface and the connecting part 80 is located on the left side. The fastening member 50 in this state is slid in the direction Xb by a sliding operation, in order to insert the tip end parts 62 and 72 of the first and second fastening parts 60 and 70 from the left side into the fastening holes 32-2a and 32-4a of the U-shaped locking parts 32-2 and 32-4 projecting to the back side of the cover part 20.

(Procedure 3)

Furthermore, the fastening member 50 is slid in the direction Xb, in order to insert the tip end parts 62 and 72 of the first and second fastening parts 60 and 70 from the left side into the fastening holes 32-1a and 32-3a of the U-shaped locking parts 32-1 and 32-3 on the right side. In the process of making this insertion, the first contact parts 91 and 93 of the fastening member 50 are bent towards the horizontal state while making sliding contact with respect to inner peripheral surfaces defining the fastening holes 32-1a and 32-3a of the U-shaped locking parts 32-1 and 32-3. In addition, when the end parts of the first contact parts 91 and 93 pass the fastening holes 32-1a and 32-3a of the U-shaped locking parts 32-1 and 32-3, the end parts return to the original inclined states thereof to make contact with the side surface parts 32-1b and 32-3b on the right side of the U-shaped locking parts 32-1 and 32-3. In this state, the end surfaces of the second contact parts 92 and 94 of the fastening member 50 make contact with the side surface parts 32-2b and 32-4b on the left side of the U-shaped locking parts 32-2 and 32-4 on the left side in FIG. 6 (second fastening operation).

Accordingly, the U-shaped locking parts 32-1 through 32-4 of the fitting member 30 are rigidly fastened by the gate-bar structure at the four locations, so as not to disengage from the cover part 20, and the fastening member 50 is held in a stable state in which the back surface of the fitting member 30 is in contiguous contact with the mounting part 40 of the cover part 20.

In addition, in the fastening member 50, the movement of the first contact parts 91 and 93 in the direction Xa with respect to the U-shaped locking parts 32-1 and 32-3 is restricted, and at the same time, the movement of the second contact parts 92 and 94 in the direction Xb with respect to the U-shaped locking parts 32-2 and 32-4 is restricted. Hence, in the fastening member 50, the U-shaped locking parts 32-1 through 32-4 of the fitting member 30 are rigidly fastened with respect to the cover part 20, and the fastening member 50 is prevented from being extracted from the U-shaped locking parts 32-1 through 32-4 even when vibration or shock is applied thereto, for example. Furthermore, the fastening operation of the fastening member 50 merely requires the sliding in the direction Xb, and thus, an assembling performance of an assembling process can be improved to increase productivity.

On the other hand, when removing the fastening member 50, the first contact parts 91 and 93 are pushed downwards so that the first contact parts 91 and 93 can pass through the U-shaped locking parts 32-1 through 32-4 in the direction Xa, and the connecting part 80 is extracted in the direction Xa. Accordingly, no special tool or the like is required to remove the setting member 30 from the cover part 20, and the fastening member 50 can be removed in a relatively easy manner in order to release the fastening of the fitting member 30 with respect to the cover part 20.

A detailed description of the preferable embodiment of the present invention is described above, however, the present invention is not limited to the embodiment described above, and various variations and modifications may be made without departing from the scope of the present invention. In addition, the embodiment described above may be combined with a part of or an entirety of another embodiment, or subjected to various modifications, including a substitution or the like.

For example, although the embodiment described above prevents the erroneous fitting by varying the width or length of the two fastening parts, it is possible to vary both the width and the length of the two fastening parts. In addition, the erroneous fitting may be prevented by varying the height dimension of the two fastening parts.

For example, in the embodiment described above, the emblem is fastened to the cover part 20, however, it is possible to fasten a part other than the emblem.

The airbag unit 1 and the cover part 20 described above may be arranged at the center part of the steering wheel of the vehicle, for example, however, the shape and the mounting position of the airbag unit 1 and the cover part 20 are not limited to the shape and the mounting position of the embodiment described above. For example, the present invention may also be applied to cases in which a fitting member is fitted on a cover part of an airbag unit for a passenger seat besides the driver's seat, built into an instrument panel, an airbag unit for a rear seat, built into a rear of the front seat, and an airbag unit built into a side of the vehicle for use upon lateral collisions.

The fastening member 50 described above is inserted in the lateral direction with respect to the vehicle, for example, however, the fastening member may be inserted in an arbitrary direction, such as a vertical direction, an oblique direction, or the like with respect to the vehicle.

In FIG. 8, for example, the first contact parts 91 and 93 may have a shape other than the cut and raised shape. For example, it is possible to provide projecting parts that project in the direction Y from the side surfaces 66 and 68 of the first fastening part 60, and projecting parts that project in the direction Y from the side surfaces 76 and 78 of the second fastening part 70. In this case, the projecting parts bend in the direction Y while making sliding contact with respect to the inner peripheral surfaces defining the fastening holes 32-1a through 32-4a of the U-shaped locking parts 32-1 through 32-4. In addition, when the projecting parts pass the fastening holes 32-1a through 32-4a, the bent projecting parts return to their original states to make contact with the side surface parts 32-1b and 32-3b on the right side of the U-shaped locking parts 32-1 and 32-3.

In addition, in FIG. 8, for example, the movement of the fastening member 50 in the direction Xb is restricted by the second contact parts 92 and 94, however, the second contact parts 92 and 94 may be omitted. In this case, the movement of the fastening member 50 in the direction Xb can be restricted by the joining part 81 of the connecting part 80.

This application is based upon and claims the benefit of priority of Japanese Patent Applications No. 2012-72590 filed on Mar. 27, 2012 and No. 2012-162759 filed on Jul. 23, 2012, to the Japan Patent Office, the entire contents of which are incorporated herein by reference.

DESCRIPTION OF REFERENCE NUMERALS

1 Airbag Unit
10, 11 Fastening Structure
20 Cover Part
21 Front Surface
22 Back Surface
30 Fitting Member
30a Base
32-1-32-4 U-shaped Locking Part
32-1a-32-4a Fastening Hole
32-1b-32-4b Side Surface Part
34-1, 34-2 Positioning Boss
36-1-36-6 Locking Hook Part
40 Mounting Part
42-1-42-4 Mounting Hole
44-1-44-8 Mounting Hole
50, 150 Fastening Member
60 First Fastening Part
62, 72 Tip End Part
63 Wide Part
66, 68, 76, 78 Side Surface
64, 74 Base End Part
70 Second Fastening Part
80 Connecting Part
90 Disengagement Preventing Part
91, 93 First Contact Part
92, 94 Second Contact Part
100 Airbag

The invention claimed is:

1. An airbag unit comprising:
   an airbag;
   a cover part which covers the airbag;
   a fitting member fitted on a front side of the cover part and provided with a first locking part and a second locking part; and
   a fastening member which fastens the fitting member on a back side of the cover part,
   wherein the fastening member includes
      a first fastening part which is inserted from a first side of the fitting member into the first locking part, to a first inserted position in a state in which the first locking part penetrates the cover part to a back side of the cover part,
      a second fastening part which is inserted from the first side of the fitting member into the second locking part, to a second inserted position in a state in which the second locking part penetrates the cover part to the back side of the cover part, and
      a connecting part which connects a base end part of the first fastening part and a base end part of the second fastening part, to form the fastening member into an approximate U-shape that fastens the fitting member on the back side of the cover part viewed in a direction generally perpendicular to the back side of the cover part,
   wherein external shapes and/or sizes of the first fastening part and the second fastening part are mutually different to prevent insertion to the first and second inserted positions, respectively, when the fastening member is inserted into the first and second locking parts at an incorrectly oriented setting, and
   wherein the incorrectly oriented setting of the fastening member includes at least one of the first fastening part being inserted into the second locking part, the second fastening part being inserted into the first locking part, and the first and second fastening parts being inserted from an incorrect, second side of the fitting member opposite to the first side.

2. The airbag unit as claimed in claim 1, wherein
   the first fastening part and the second fastening part have lengths along a direction in which the first and second fastening parts extend, and widths along a direction in which the first and second fastening parts separate, and
   at least one of the lengths and the widths are different between the first and second fastening parts.

3. The airbag unit as claimed in claim 1, wherein at least one of the first and second fastening parts has a part preventing insertion thereof through the locking part through which the other of the first and second fastening parts is to be inserted into a corresponding one of the first and second inserted positions.

4. The airbag unit as claimed in claim 1, wherein the first fastening part includes a non-insertable part which is formed to be non-insertable into the first locking part from the second side of the fitting member.

5. The airbag unit as claimed in claim 1, wherein at least one of the first and second fastening parts includes a disengagement preventing part which prevents the one of the first and second fastening parts from disengaging from the locking part through which the at least one of the first and second fastening parts is to be inserted.

6. The airbag unit as claimed in claim 5, wherein the disengagement preventing part includes a first contact part provided on a tip end part side of at least one of the first and second fastening parts, and the first contact part makes contact with the tip end part side of the locking part through which the at least one of the first and second fastening parts is inserted.

7. The airbag unit as claimed in claim 6, wherein the disengagement preventing part includes a second contact part provided on a base end part side of at least one of the first and second fastening parts, and the second contact part makes contact with the base end part side of the locking part through which the at least one of the first and second fastening parts is inserted.

8. The airbag unit as claimed in claim 7, wherein the second contact part includes
   a contact part on a first base end part side of the first fastening part, and
   a contact part on a second base end part side of the second fastening part,
   wherein the contact parts on the first and second base end part sides are provided at mutually different positions along the direction in which the first and second fastening parts extend.

9. The airbag unit as claimed in claim 8, wherein a distance between the contact part on the first tip end part side and the contact part on the first base end part side is different from a distance between the contact part on the second tip end part side and the contact part on the second base end part side.

10. An airbag unit comprising:
    an airbag;
    a cover part which covers the airbag;
    a fitting member which is fitted on a front side of the cover part; and
    a fastening member which fastens the fitting member on a back side of the cover part,
    wherein the fastening member includes
       a first fastening part which is inserted from a side into a first locking part provided on the fitting member, in a state in which the first locking part penetrates the cover part to a back side of the cover part,
       a second fastening part which is inserted from the side into a second locking part provided on the fitting member, in a state in which the second locking part penetrates the cover part to the back side of the cover part, and
       a connecting part which connects a base end part of the first fastening part and a base end part of the second fastening part,
    wherein external shapes of the first fastening part and the second fastening part are mutually different,
    wherein the first fastening part includes a non-insertable part which is formed to be non-insertable into the first locking part from a side opposite to a correct side,
    wherein the first locking part includes a first inserted part and a second inserted part arranged in an inserting direction of the first fastening part, and
    wherein the non-insertable part is formed to be insertable into the first inserted part from the correct side, and non-insertable into the second inserted part from the side opposite to the correct side.

11. The airbag unit as claimed in claim 10, wherein
    the first fastening part and the second fastening part have lengths along a direction in which the first and second fastening parts extend, and widths along a direction in which the first and second fastening parts separate, and
    at least one of the lengths and the widths are different between the first and second fastening parts.

12. The airbag unit as claimed in claim 10, wherein at least one of the first and second fastening parts has a part preventing insertion thereof through the locking part through which the other of the first and second fastening parts is to be inserted into a corresponding one of the first and second inserted positions.

13. An airbag unit comprising:
   an airbag;
   a cover part which covers the airbag;
   a fitting member which is fitted on a front side of the cover part; and
   a fastening member which fastens the fitting member on a back side of the cover part,
   wherein the fastening member includes
      a first fastening part which is inserted from a side into a first locking part provided on the fitting member, in a state in which the first locking part penetrates the cover part to a back side of the cover part,
      a second fastening part which is inserted from the side into a second locking part provided on the fitting member, in a state in which the second locking part penetrates the cover part to the back side of the cover part, and
      a connecting part which connects a base end part of the first fastening part and a base end part of the second fastening part,
   wherein external shapes of the first fastening part and the second fastening part are mutually different,
   wherein at least one of the first and second fastening parts includes a disengagement preventing part which prevents the one of the first and second fastening parts from disengaging from the locking part through which the one of the first and second fastening parts is inserted,
   wherein the disengagement preventing part includes a first contact part provided on a tip end part side of at least one of the first and second fastening parts, and the first contact part makes contact with the tip end part side of the locking part through which the at least one of the first and second fastening parts is inserted,
   wherein the first contact part includes
   a contact part on a first tip end part side provided on the tip end part side of the first fastening part, and
   a contact part on a second tip end part side provided on the tip end part side of the second fastening part, and
   wherein the contact parts on the first and second tip end part sides are provided at mutually different positions along the direction in which the first and second fastening parts extend.

14. The airbag unit as claimed in claim 13, wherein
   the first fastening part and the second fastening part have lengths along a direction in which the first and second fastening parts extend, and widths along a direction in which the first and second fastening parts separate, and at least one of the lengths and the widths are different between the first and second fastening parts.

15. The airbag unit as claimed in claim 13, wherein at least one of the first and second fastening parts has a part preventing insertion thereof through the locking part through which the other of the first and second fastening parts is to be inserted into a corresponding one of the first and second inserted positions.

16. The airbag unit as claimed in claim 13, wherein the first fastening part includes a non-insertable part which is formed to be non-insertable into the first locking part from the second side of the fitting member.

17. A fastening structure comprising:
   a cover part which covers an airbag;
   a first locking part and a second locking part provided on a fitting member which is fitted on a front side of the cover part; and
   a fastening member which fastens the fitting member on a back side of the cover part,
   wherein the fastening member includes
      a first fastening part which is inserted from a first side of the fitting member into the first locking part to a first inserted position in a state in which the first locking part penetrates the cover part to a back side of the cover part,
      a second fastening part which is inserted from the first side of the fitting member into the second locking part to a second inserted position in a state in which the second locking part penetrates the cover part to the back side of the cover part, and
      a connecting part which connects a base end part of the first fastening part and a base end part of the second fastening part, to form the fastening member into an approximate U-shape that fastens the fitting member on the back side of the cover part viewed in a direction generally perpendicular to the back side of the cover part,
   wherein external shapes and or sizes of the first fastening part and the second fastening part are mutually different to prevent insertion to the first and second fully inserted positions, respectively, when the fastening member is inserted into the first and second locking parts at an incorrectly oriented setting, and
   wherein the incorrectly oriented setting of the fastening member includes at least one of the first fastening part being inserted into the second locking part, the second fastening part being inserted into the first locking part, and the first and second fastening parts being inserted from an incorrect, second side of the fitting member opposite to the first side.

* * * * *